(12) United States Patent
Sefton et al.

(10) Patent No.: US 8,218,821 B2
(45) Date of Patent: Jul. 10, 2012

(54) VIDEO PREPROCESSING OF IMAGE INFORMATION FOR CHARACTER RECOGNITION

(75) Inventors: Alan K. Sefton, Knoxville, TN (US); Kent A. Rinehart, Knoxville, TN (US)

(73) Assignee: Pips Technology, Inc., Knoxville, TN (US)

( * ) Notice: Subject to any disclaimer, the term of this patent is extended or adjusted under 35 U.S.C. 154(b) by 1434 days.

(21) Appl. No.: 11/625,896

(22) Filed: Jan. 23, 2007

(65) Prior Publication Data

US 2008/0175479 A1 Jul. 24, 2008

(51) Int. Cl.
*G06K 9/00* (2006.01)

(52) U.S. Cl. ........ 382/105; 348/169; 348/154; 348/155; 348/465; 348/445; 382/181; 382/182; 382/103; 362/497; 40/200; 386/242; 725/12; 725/20; 352/121; 358/909.1

(58) Field of Classification Search .................. 386/242; 725/12; 902/6; 382/181–182, 105; 358/909.1; 362/497; 40/200
See application file for complete search history.

(56) References Cited

U.S. PATENT DOCUMENTS

| 5,857,121 A * | 1/1999 | Arai et al. ........................ 396/51 |
| 5,905,848 A * | 5/1999 | Yano et al. ..................... 386/225 |
| 6,339,651 B1 | 1/2002 | Tian et al. |
| 6,747,687 B1 * | 6/2004 | Alves ............................ 348/148 |
| 2005/0169367 A1 | 8/2005 | Venetianer et al. |
| 2006/0215882 A1 * | 9/2006 | Ando et al. ................... 382/106 |

FOREIGN PATENT DOCUMENTS

| GB | 2332322 B | | 3/2001 |
| GB | 2332322 B | * | 3/2001 |
| WO | 2004006184 | | 1/2004 |

* cited by examiner

*Primary Examiner* — Jefferey Harold
*Assistant Examiner* — Omer Khalid
(74) *Attorney, Agent, or Firm* — Luedeka Neely Group, P.C.

(57) ABSTRACT

An apparatus processes video signals containing video information related to a scene which may contain a vehicle license plate. The apparatus includes a video camera having a video imaging device for viewing the scene and generating a first video signal. A character detector in the video camera processes the first video signal to detect a license plate within the scene and to generate location information indicating the location of the license plate. A line detector in the camera determines a particular video line of the first video signal into which the location information is to be embedded. An insertion circuit in the camera embeds the location information into the particular video line of the first video signal to form a second video signal. The apparatus may also include a video capture device for receiving the second video signal from the video camera and converting the second video signal into digital image data. A processor extracts the location information from the digital image data, determines the location of the license plate characters within the scene based on the location information, and processes the digital image data to read the license plate characters.

14 Claims, 4 Drawing Sheets

VIDEO PREPROCESSING OF IMAGE INFORMATION FOR CHARACTER RECOGNITION

FIELD

This invention relates to the field of video image processing. More particularly, this invention relates to a system for finding a location of a license plate and inserting the license plate location information into a standard video signal.

BACKGROUND

Automatic License Plate Reading (ALPR) systems are used by security and law enforcement personnel to find and read vehicle license plate numbers in images produced by video cameras and still cameras. As shown in FIG. 4, a typical ALPR system consists of a video imaging device, a video capture device and a computer running ALPR software. The video camera sends video images to the video capture device as a standard television format video signal. The video capture device converts the video signal into digital image information and stores the digital information in the computer. The computer's software then begins the ALPR process by first locating the license plate in the image as represented by the digital information. If a license plate is detected in the image, the computer software performs a character recognition process to "read" the license plate number.

In a typical ALPR system, video images are sent to the video capture device at either 50 or 60 images (or frames) per second, depending on the video format. In typical applications of ALPR systems, only a small fraction of the images received by the video capture device actually contain a license plate. Since the prior systems provided no indication to the computer regarding which images contained a license plate, the computer's software had to process each and every image to determine whether a license plate appeared in the image. Since computer-implemented license plate detection algorithms tend to be very computationally intense, a large portion of the computer's processing power in prior systems was used to search for and detect the presence of a license plate.

What is needed, therefore, is a means for flagging the video images that may include a license plate, and for processing only those flagged images to read the license plate character information.

SUMMARY

To meet the above and other needs, the present invention provides an apparatus and method for performing the computationally-intensive license plate detection process in video hardware before the video signal is provided to a computer for further processing. Once a license plate is detected, the invention embeds the license plate coordinates in the standard video signal that is sent to the computer. In a preferred embodiment, a video imaging device is used to view a scene and generate a corresponding standard video signal. The standard signal from the video imaging device is processed for license plate detection, such as using techniques similar to those disclosed in U.K. Patent No. GB2332322B. If a license plate is detected, the coordinates are generated to indicate the location of the license plate in the image. The resulting coordinates of the detected license plate are then bit-serialized with error detecting check bits. A video line detection device designates a line of the video signal into which the bit-serialized license plate coordinates are to be inserted. A data insertion device then inserts the bit-serialized license plate coordinates into the designated video line in accordance with television video format standards. In this manner, the video signal is sent to the computer with the license plate coordinate information embedded in the video signal. A video capture device captures the video images from the video signal, and the coordinate information is extracted from each image. Using the coordinate information, a license plate reading algorithm running on the computer can be programmed to process only the video frame or frames containing a license plate. In a preferred embodiment of the invention, the algorithm "looks" only at that part of the frame or frames indicated by the embedded coordinates.

With this improvement, the processor is relieved of the computationally intensive task of performing the license plate detection. The reduced processing requirements for the computer allows for lower processor temperatures, less expensive processors and simultaneous processing of multiple images.

In one embodiment, the invention provides an apparatus for processing video signals containing video information related to a scene, where the scene may contain characters of interest. The apparatus comprises a video camera which includes a video imaging device for viewing the scene and generating a first video signal. A character detector in the video camera processes the first video signal to detect characters of interest present in the scene. A line detector determines the video line of the video field into which indicator information is to be embedded, where the indicator information indicates where the characters of interest are present in the scene. An insertion circuit in the camera embeds the indicator information within the first video signal to form a second video signal. The camera includes a housing for enclosing the video imaging device, the character detector and the insertion circuit. A video output connector is provided on the camera housing for providing electrical connection to the second video signal.

In a preferred embodiment, the apparatus includes a video capture device and a processor. The video capture device is for receiving the second video signal from the video camera and converting the second video signal into digital image data representing the scene. The processor is for extracting the indicator information from the digital image data, for determining based on the indicator information whether the characters of interest are present in the scene, and for processing the digital image data to read the characters of interest.

In some embodiments, the character detector of the video camera processes the first video signal to determine location information indicating a location of characters of interest within the scene. The insertion circuit embeds the location information within the first video signal to form the second video signal. After the second video signal is converted into digital image data, the processor extracts the location information from the digital image data and processes the digital image data based at least in part on the location information.

In another aspect, the invention provides a method for processing a video signal containing video information related to a scene which may contain characters of interest. The method includes steps of: (a) acquiring the video signal; (b) processing the video signal to detect whether characters of interest are present in the scene; (c) embedding indicator information into the video signal to indicate the presence of the characters of interest in the scene; (d) converting the video signal into digital image data representing the scene; (e) extracting the indicator information from the digital image data; (f) determining based on the indicator information that characters of interest are present in the scene; and (g) processing the digital image data to determine the characters of interest.

In a preferred embodiment of the method, step (b) includes processing the video signal to determine location information indicating a location of the characters of interest within the scene, step (c) includes embedding the location information into the video signal, step (e) includes extracting the location information from the digital image data, and step (g) includes processing the digital image data based at least in part on the location information.

BRIEF DESCRIPTION OF THE DRAWINGS

Further advantages of the invention are apparent by reference to the detailed description in conjunction with the figures, wherein elements are not to scale so as to more clearly show the details, wherein like reference numbers indicate like elements throughout the several views, and wherein.

DETAILED DESCRIPTION

In the description of the invention provided herein, the term "video signal" generally refers to an composite video signal formatted according to the NTSC (National Television System Committee) standard, the PAL (phase-alternating line) standard or the SÉCAM (Séquentiel couleur à mémoire) standard. As will be appreciated by those skilled in the art, such video signals comprise some number of frames per second (such as 29.97 fps for NTSC), where each frame consists of some number of horizontal lines (such as 525 lines for NTSC) that are traced sequentially in a raster-scan fashion. In the NTSC format, 484 of the 525 lines of each frame are used to form the video image, while the remaining lines are used for sync, vertical retrace and other information, such as closed-captioning.

As used herein, the phrase "video line" refers to one of the horizontal lines that forms a portion of a frame of a composite video signal. As set forth in further detail below, the present invention uses at least one of the video lines of each frame to embed information regarding whether and/or where license plate characters are located in a scene depicted in the video frame. As used herein, the term "scene" generally refers to one or more video images as sensed by a video imaging device. Thus, a "scene" may also generally refer to one or more frames of video information in a video signal.

The term "characters" or the phrase "characters-of-interest" as used herein generally refer to a string of letters and/or numbers as typically comprise a vehicle license plate number. However, it should be appreciated that the present invention is also applicable to detection and reading of other types of character strings or symbols, and is not limited solely to license plate recognition.

Figure 1:
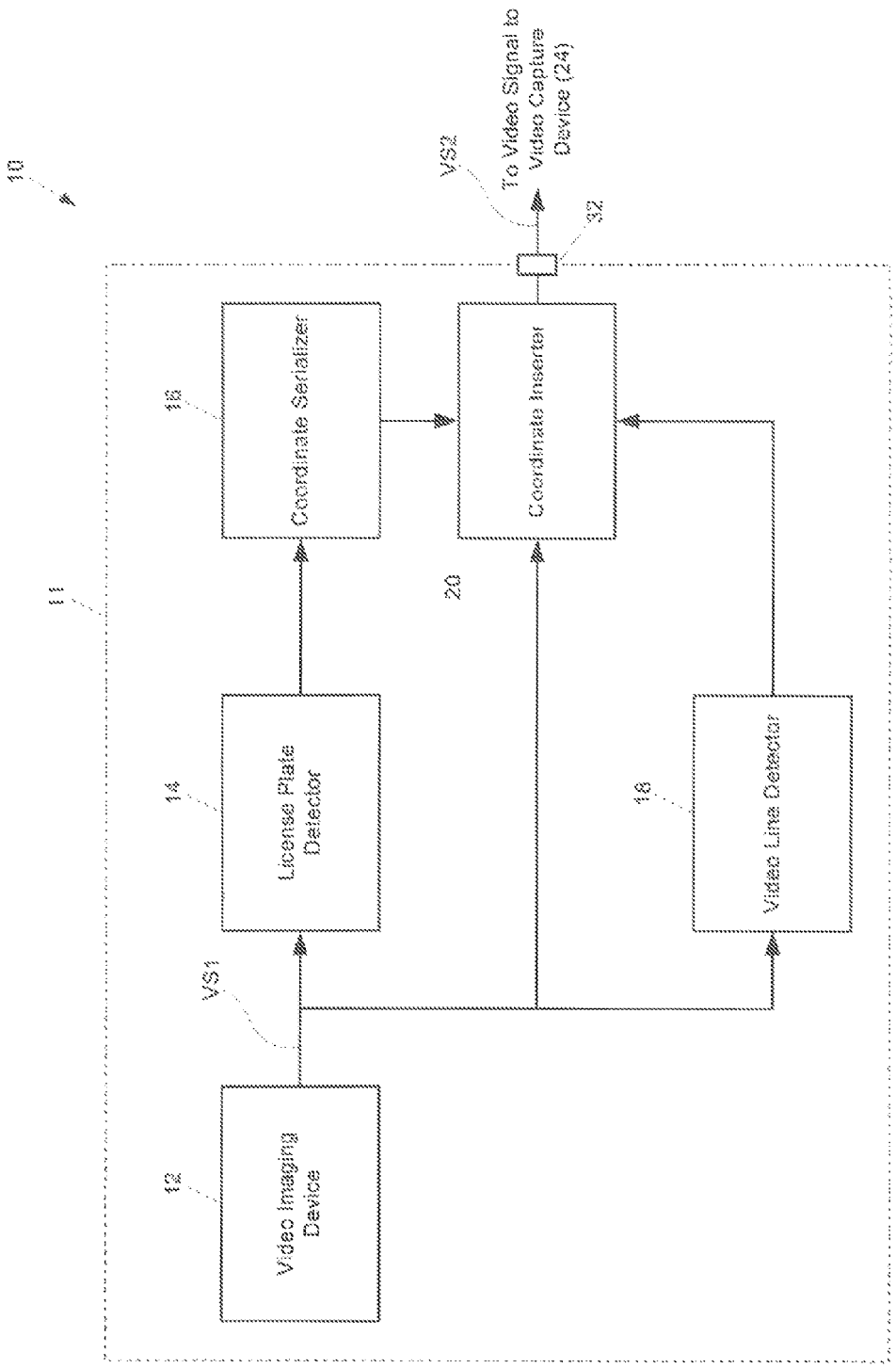
FIG. 1 depicts a functional block diagram of a video pre-processing system according to a preferred embodiment of the invention.

FIG. 1 depicts a preferred embodiment of a video camera 10 having built-in license plate detection circuitry. The components of the camera 10, each of which is described in more detail below, are preferably contained within a housing 11 which has a form factor similar to that of a standard video surveillance camera. In the following description, reference is made to FIG. 3 which depicts steps in a preferred process for processing a video image to locate and extract information from characters-of-interest.

Figure 3:
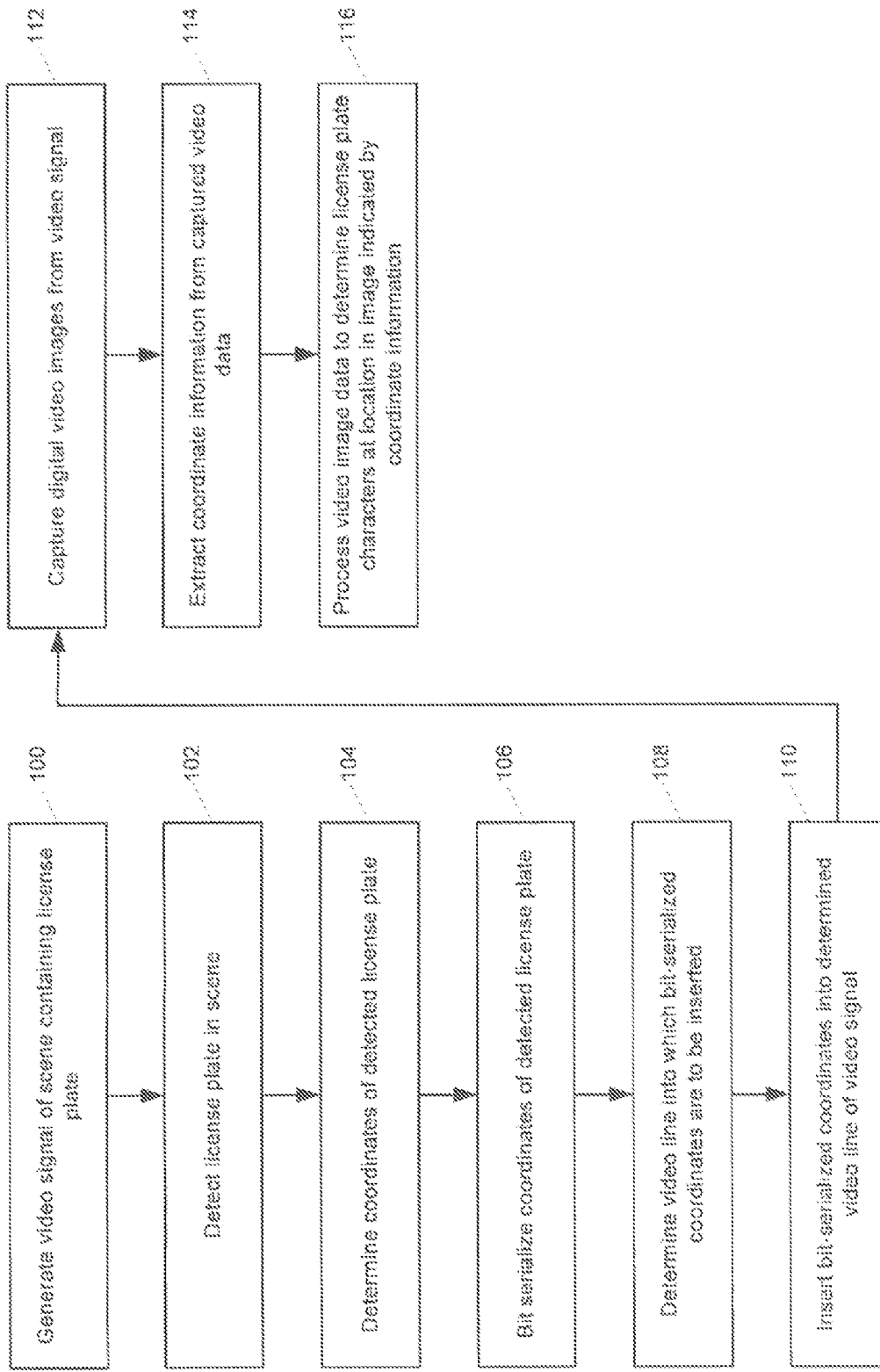
FIG. 3 depicts a method for performing video preprocessing and digital image processing for license plate reading according to a preferred embodiment of the invention.
Figure 4:
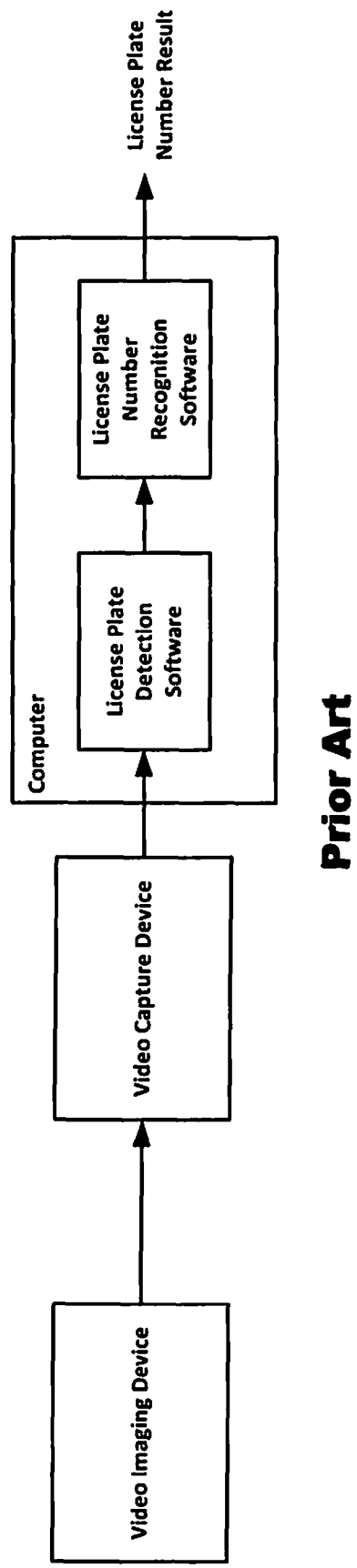
FIG. 4 depicts a prior art automatic license plate reading system.

As shown in FIG. 1, the camera 10 includes a video imaging device 12, which comprises standard video camera lenses, electro optics and electronic circuitry for capturing optical images and converting the optical images into a video signal (step 100 in FIG. 3). One example of the video imaging device 12 is the model number P362 video surveillance camera manufactured by PIPS Technology, Inc. The video signal at the output of the imaging device 12 is referred to herein as the first video signal VS1.

The camera 10 also includes a license plate detector circuit 14 which receives the first video signal VS1 from the video imaging device 12. According to a preferred embodiment of the invention, the license plate detector circuit 14 operates on the first video signal VS1 according to the techniques described in UK patent number GB2332322 to locate a vehicle license plate within one or more of the images produced by the imaging device 12 (step 102).

As described in GB2332322, the license plate detector 14 may include a band-pass filter having a bandwidth and center frequency selected to detect a component of the spatial frequency spectrum of a vehicle license plate within the video image. For example, the spectrum may be based on typical character-to-character spacing. The output of the filter is rectified and integrated to provide a measure of the energy present with the pass band of the filter. The detector 14 may also include a comparator circuit which compares the integrated output to a threshold level, where the threshold is selected such that video fields containing license plates are above the threshold. In this embodiment, the output of the comparator signifies the presence or absence of a license plate on a particular video line. By clocking the output of the comparator into a serial-in, parallel-out shift register, the presence of a plate on a number of consecutive video lines can be detected. The size of the shift register is set to the number of video lines that a license plate may typically occupy based on the deployment of the imaging device 12. In this embodiment, an AND gate may be used to detect whether all of the output bits of the shift register are "true" at the same time, which would indicate the presence of a license plate in the video frame. The output of the AND gate may be used as an input signal to a digital counter, where the counter is reset on each video frame and clocked on each video line, such as using a line synchronization pulse. At the end of a frame, the counter holds the count of the last video line at which a license plate was detected. This line number provides an indication of the location of the license plate within the video frame (step 104).

It will be appreciated that other techniques may be implemented in the license plate detector 14 to locate a license plate and generate one or more location coordinates indicating a position of the license plate within a video frame (step 104). The process described in GB2332322, as summarized above, as is merely an example of one technique. The location coordinate information may be a single value, such as a video line number referenced from the top or bottom of a video frame. Alternatively, the location coordinate information may be X-Y coordinate values indicating a center or corner of a license plate.

With continued reference to FIG. 1, the location coordinate output of the detector 14 is provided to a bit serializer circuit 16. In a preferred embodiment, the bit serializer circuit 16 converts the output of the detector 14 to a bit-serialized format with error-detecting check bits (step 106). In one embodiment, the bit serializer combines a 9-bit binary Y coordinate, a 10-bit binary X coordinate and a 5-bit checksum to form a 24-bit binary word. This binary word may then be shifted out using a parallel-to-serial converter. The output of the bit serializer 16 is provided to a coordinate inserter 20, which is described hereinafter.

In the preferred embodiment, the apparatus 10 includes a video line detector circuit 18 that determines on which video line of the video signal VS1 to insert the coordinate information (step 108). In one preferred embodiment, the video line detector 18 is a counter that counts some number n of video lines from the top of the video frame and generates a trigger signal upon detection of the desired line. For example, if n is set to 520, the detector 18 will generate the trigger signal when video line number 520 of the video frame is detected. This trigger signal is provided to the coordinate inserter circuit 20.

As shown in FIG. 1, the coordinate inserter 20 receives the first video signal VS1 from the video imaging device 12, the bit-serialized location coordinate information from the bit serializer 16 and the trigger signal from the video line detector 18. When triggered by the trigger signal, the coordinate inserter 20 inserts the bit-serialized location coordinate information into the desired video line of the first video signal VS1 (step 110). In one preferred embodiment, the coordinate inserter 20 represents each bit from the bit serializer as 16 pixels, where a bit value of a logic "1" could be represented by a white video level and a logic "0" could be represented by a black video level. Thus, if the trigger signal is generated at the $520^{th}$ video line, the bit-serialized location coordinate information is inserted into the $520^{th}$ video line. The output of the coordinate inserter 20 is a video signal, referred to herein as the second video signal VS2, which is preferably identical to the video signal VS1 except for the presence of the bit-serialized license plate coordinate information present in one of the video lines of each frame.

In situations where the license plate detector 14 does not detect the presence of a license plate within a scene, the coordinate inserter 20 inserts a null value (such as 0-0 for the X-Y coordinates) into the predetermined line of the video signal.

As discussed above, in a preferred embodiment of the invention, the video imaging device 12, plate detector 14, coordinate serializer 16, video line detector 18 and coordinate inserter 20 are packaged in a single housing which is represented in FIG. 1 by the dashed box 11. Preferably, a video output connector 32 is disposed on the housing 11 for providing access to the second video signal VS2.

Figure 2:
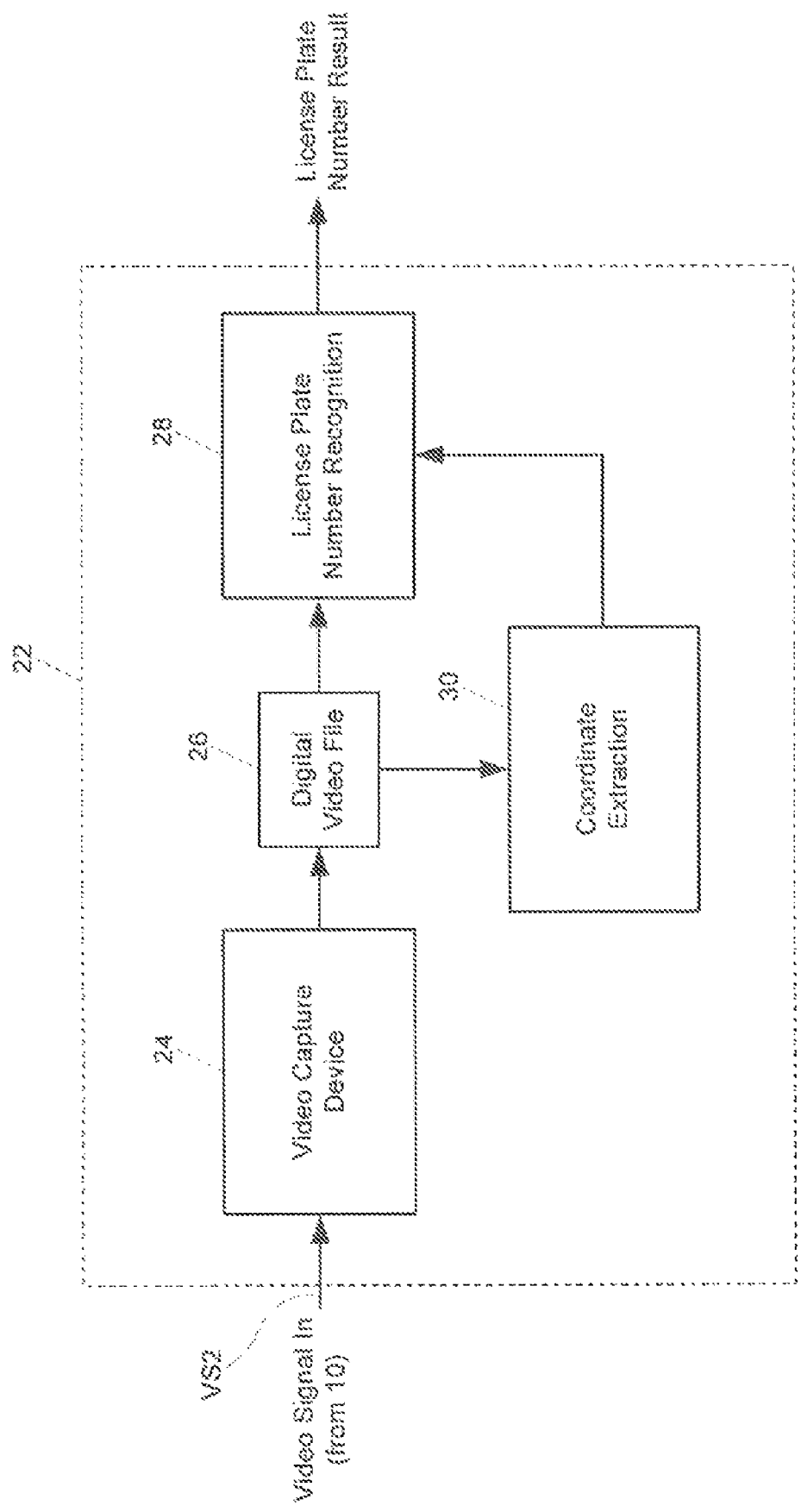
FIG. 2 depicts a functional block diagram of a digital image processing system according to a preferred embodiment of the invention.

FIG. 2 depicts a preferred embodiment of a digital image processing system 22. Generally, the system 22 receives the second video signal VS2, converts the signal VS2 into a digital video format, locates the license plate within a digital video image based at least in part on the coordinate information embedded in the video signal VS2, and determines the alphanumeric characters in the license plate. In a preferred embodiment, these functions are performed by components of a personal computer. The system 22 includes a video capture device 24, such as a video I/O card, for receiving the second video signal VS2 and converting the video signal into a digital video stream or file 26 having a standard digital format, such as Digital Video (DV) format, Audio Video Interleave (AVI) format or Moving Picture Experts Group (MPEG) format (step 112 in FIG. 3). A coordinate extractor 30, which may be a software module running on a computer processor associated with the system 22, operates on the digital video 26 and extracts the coordinate information that indicates the position of a license plate within the video image(s) represented by the digital video 26 (step 114).

A license plate number recognition module 28 receives the digital video 26 and the coordinate information from the extractor module 30. Using the coordinate information, the license plate number recognition module 28 preferably operates only on that portion of the video data containing the license plate image to determine the alphanumeric characters in the plate (step 116). Preferably, the module 28 operates only on the specific frame or frames indicated by the coordinate information. In some embodiments, the module 28 may process all of the indicated frame or frames to find the license plate characters. In a most preferred embodiment, the module 28 operates only on a specific portion of the indicated frame or frames, where the specific portion corresponds to the embedded X-Y coordinates. The character determination process is preferably performed using a technique such as that implemented in PAGIS™, a commercially available software application developed by PIPS Technology, Inc. Thus, the output of the license plate number recognition module 28 is a string of alphanumeric characters in the license plate. Since the license plate is located by the circuitry in the camera 10, the computer system 22 need not engage in the computationally intensive task of locating the plate.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for processing video information related to a scene which may contain characters of interest, the method comprising:

(a) acquiring a video signal comprising a plurality of horizontal lines containing the video information related to the scene;

(b) processing the video signal to detect whether characters of interest are present in the scene;

(c) embedding indicator information into one or more of the horizontal lines of the video signal, where the indicator information indicates the presence of the characters of interest in the scene;

(d) converting the video signal with the embedded indicator information into digital image data representing the scene;

(e) extracting the indicator information from the digital image data;

(f) determining based on the indicator information that characters of interest are present in the scene; and (g) processing the digital image data to determine the characters of interest.

2. The method of claim 1 wherein:

step (b) comprises processing the video signal to determine location information indicating a location of the characters of interest within the scene;

step (c) comprises embedding the location information into one or more of the horizontal lines of the video signal;

step (e) comprises extracting the location information from the digital image data; and step (g) comprises processing the digital image data based at least in part on the location information.

3. The method of claim 1 wherein step (c) includes embedding the indicator information into a particular video line of one or more video frames in the video signal.

4. The method of claim 1 wherein step (c) includes embedding the indicator information in a bit-serialized format in the video signal.

5. The method of claim 1 wherein the characters of interest comprise characters of a vehicle license plate.

6. The method of claim 1 wherein step (g) comprises processing the digital image data only if the indicator information indicates that characters of interest are present within the scene.

7. The method of claim 1 wherein step (a) comprises acquiring the video signal from a video camera viewing the scene.

8. A method for processing a video signal comprising a plurality of horizontal lines containing video information related to a scene containing characters of interest, the method comprising:
  (a) acquiring the video signal from a video camera viewing the scene;
  (b) processing one or more frames of the video signal to determine a location of characters of interest within the scene;
  (c) generating location coordinates indicating the location of the characters of interest within the scene, wherein the location coordinates are values referenced to a top or bottom of the one or more frames, or are X-Y coordinate values; and
  (d) embedding the location coordinates in one or more of the horizontal lines of the video signal.

9. An apparatus for processing video information related to a scene which may contain characters of interest, the apparatus including a video camera comprising:
  a video imaging device for viewing the scene and generating a first video signal comprising a plurality of horizontal lines;
  a character detector for processing the first video signal to detect characters of interest present in the scene;
  an insertion circuit for embedding indicator information within one or more of the horizontal lines of the first video signal to form a second video signal, the indicator information indicating that the characters of interest are present in the scene;
  a camera housing for enclosing the video imaging device, the character detector and the insertion circuit; and
  a video output connector on the camera housing for providing electrical connection to the second video signal.

10. The apparatus of claim 9 further comprising a line detector for determining a video line of one or more video frames of the first video signal into which the indicator information is to be embedded.

11. The apparatus of claim 9 further comprising:
  a video capture device for receiving the second video signal from the video camera and converting the second video signal into digital image data representing the scene; and
  a processor for extracting the indicator information from the digital image data, for determining based on the indicator information whether the characters of interest are present in the scene, and for processing the digital image data to read the characters of interest.

12. The apparatus of claim 11 wherein:
  the character detector processes the first video signal to determine location information indicating a location of the characters of interest within the scene;
  the insertion circuit embeds the location information within one or more of the horizontal lines of the first video signal to form the second video signal; and
  the processor extracts the location information from the digital image data and processes the digital image data based at least in part on the location information.

13. The apparatus of claim 9 wherein the insertion circuit embeds the indicator information within a particular video line of one or more video frames in the first video signal to form the second video signal.

14. The apparatus of claim 9 wherein the insertion circuit embeds the indicator information in a bit-serialized format within the first video signal to form the second video signal.

* * * * *